Nov. 3, 1925.  1,560,345
J. H. FRIEND
RIM CONSTRUCTION FOR DISK WHEELS
Filed Feb. 5, 1924   2 Sheets-Sheet 1
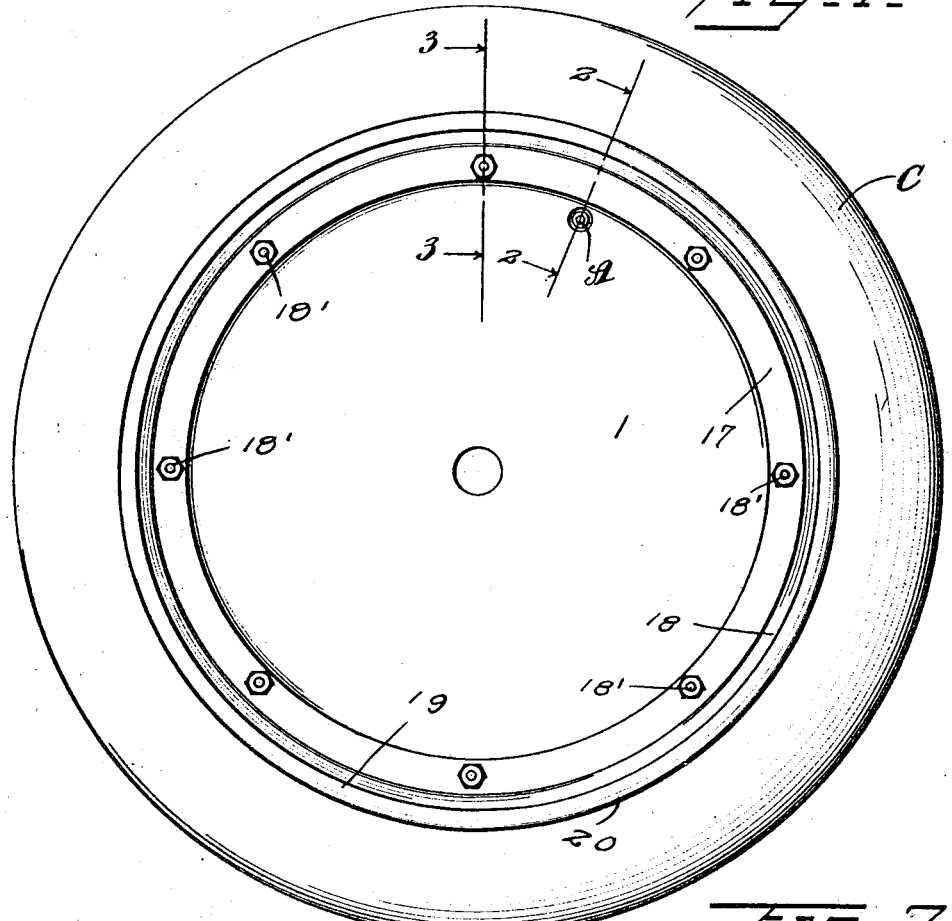
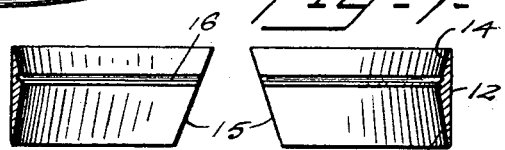
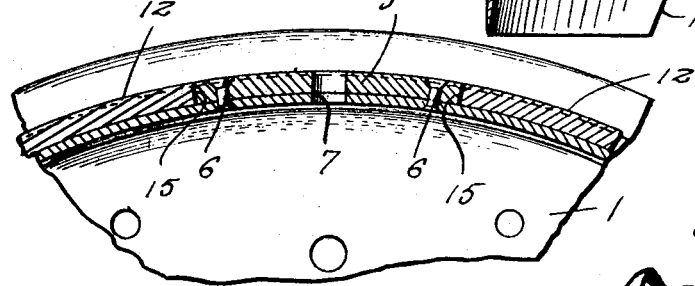
Inventor
J. H. Friend Nov. 3, 1925.
J. H. FRIEND
1,560,345
RIM CONSTRUCTION FOR DISK WHEELS
Filed Feb. 5, 1924   2 Sheets-Sheet 2
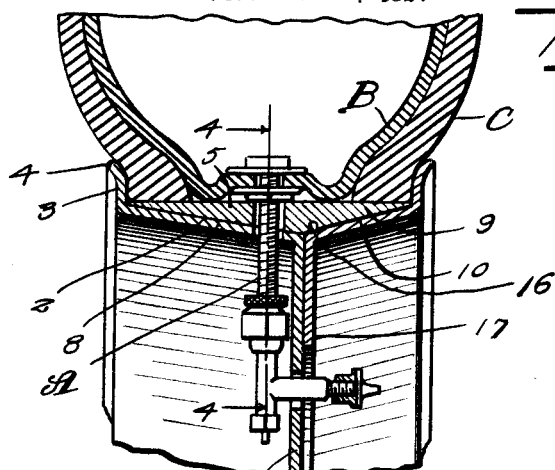
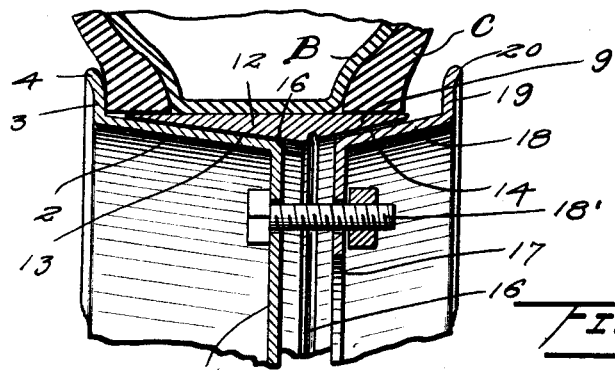
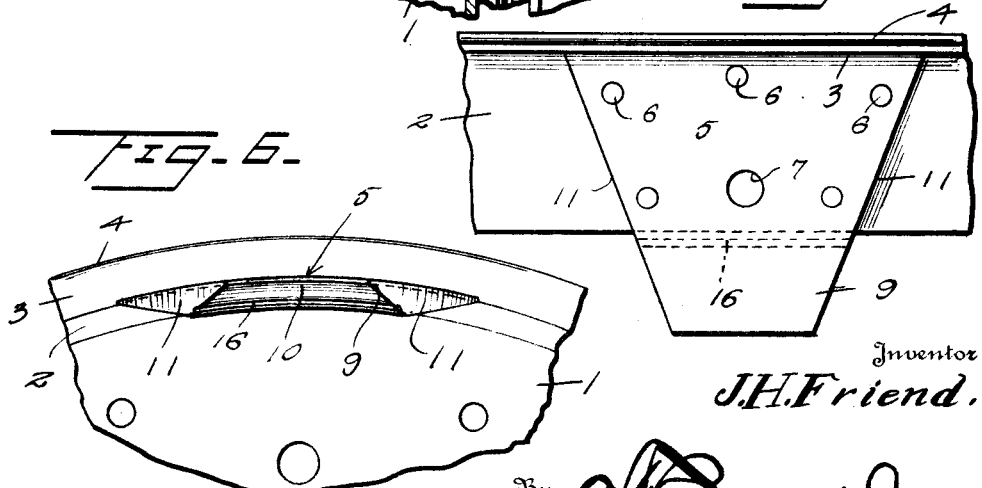
Inventor
J. H. Friend.

Patented Nov. 3, 1925.

1,560,345

UNITED STATES PATENT OFFICE.

JACOB H. FRIEND, OF CHARLESTON, WEST VIRGINIA.

RIM CONSTRUCTION FOR DISK WHEELS.

Application filed February 5, 1924. Serial No. 690,754.

*To all whom it may concern:*

Be it known that I, JACOB H. FRIEND, a citizen of the United States, residing at Charleston, in the county of Kanawha and State of West Virginia, have invented certain new and useful Improvements in Rim Construction for Disk Wheels; and I do hereby declare the following to be a full, clear, and exact description of the invention, such as will enable others skilled in the art to which it appertains to make and use the same.

This invention relates to automobile wheels of the disk type and has for its principal object the provision of improved means for supporting the tire in the rim of the wheel to the end that the tire may be readily removed from the wheel, particularly after the tire has been on the wheel for months so that it would otherwise ordinarily adhere to the rim.

A further object of the invention is the provision of an automobile wheel having a removable ring, the rim of the wheel at the outer face of the ring being outwardly inclined, and providing a split ring having oppositely inclined inner faces to engage the faces of the rim of the wheel and the ring, and its outer face flat to receive the tire, this construction providing for easy removal of the tire from the rim and replacement thereon.

The invention will be described in detail hereinafter and will be found illustrated in the accompanying drawings, in which:

Figure 1 is a side view in elevation of my improved automobile wheel showing the tire in place, Figure 2 a fragmental sectional view on the plane indicated by the line 2—2 of Figure 1, Figure 3 a similar view on the line 3—3 of Figure 1, Figure 4 a fragmental sectional view of the rim and tire-supporting ring on a plane indicated by the line 4—4 of Figure 2, Figure 5 a fragmental view of the wheel rim, Figure 6 a fragmental view in elevation of the part of the wheel shown in Figure 5, and Figure 7 a cross section of the tire-supporting ring.

In the drawings similar reference characters will be used to designate corresponding parts in the several views.

As shown in the drawings a wheel 1 of the disk type is provided with an outwardly inclined rim section 2 and a flange 3 outwardly flared as shown at 4. Secured to rim section 2 is a plate 5 by means of rivets 6, or any other suitable fastenings, and an opening 7 for the valve stem A of the inner tube B of tire C. The inner face of plate 5 is formed with an inclined portion 8 that seats upon the inclined face 2 of the rim section, and the plate 5 is provided with a portion 9 which projects beyond the face of the wheel 1 and has an outwardly inclined inner surface 10. The two ends of the plate 5 indicated at 11 are inclined on converging planes as clearly shown in Figures 5 and 6 for a purpose to be hereinafter stated.

12 designates a tire-supporting ring having a flat outer surface on which the tire C is seated while its inner face is inclined as shown at 13 to engage the inclined face of the rim section 2 and has also another inclined face 14 to engage the clamping ring to be hereinafter described. Ring 12 is split and has its ends formed with oppositely inclined faces 15 to engage the faces 11 of plate 5 when in position on the wheel. 16 indicates a groove in the inner face of the ring 12 in the angle formed by the inclined faces 13 and 14, the purpose of this groove 16 being to assist in removing the ring 12 from the tire by receiving a tool for that purpose, should there be difficulty in removing the ring from the tire.

17 indicates the clamping ring that is secured to wheel 1 by means of screw bolts and nuts 18' or any other suitable fastening means, and has an outwardly inclined portion 18 to engage the face 14 of the ring 12, and a flange 19 to engage the edge of ring 12 with an outwardly flared portion 20.

It will be readily apparent that when the tire is in place on the wheel it rests upon the plate 5 and the outer face of the ring 12, plate 5 forming a stop to prevent circumferential movement of the ring 12 on the wheel. In removing the tire from the wheel it will be readily apparent that after the clamping ring 17 is removed that the tire may be easily displaced, the inclined surfaces 13 of the ring 12 and of the rim 2 contributing to permit easy removal of the tire. In event the ring 12 should stick to the rim 2, the groove 16 permits of the use of a tool for prying the rim loose.

What is claimed is:

1. In an automobile wheel, a rim section provided with an inclined face, a plate secured to said rim section, a split ring adapted to engage the edges of said plate and having its inner surface inclined to conform to the inclined face of the rim section, and a clamping ring securable to said wheel complemental to said rim section and engaging said split ring.

2. In a wheel, a rim section having an inclined surface, a clamping ring having a surface inclined oppositely to the first mentioned inclined surface; means to secure the rim section and clamping ring together, and an open tire supporting ring surrounding said rim section and clamping ring and having inclined surfaces engaging and corresponding with the inclined surfaces of said rim section and clamping ring, and a plate carried by one of the parts located intermediate the ends of said tire supporting ring.

3. In a wheel, a rim section having an inclined surface, a clamping ring having a surface inclined oppositely to the first mentioned inclined surface, means to secure the rim section and clamping ring together, and an open tire supporting ring surrounding said rim section and clamping ring and having inclined surfaces engaging and corresponding with the inclined surfaces of said rim section and clamping ring, and a plate carried by one of the parts located intermediate the ends of said tire supporting ring, said plate being substantially of wedge shape.

4. In an automobile wheel, a rim section formed with an inclined face, a clamping ring removably secured to said wheel and having a portion inclined oppositely to the inclination of the rim section, a plate secured to the rim section and having its inner surface formed with inclined faces to engage the inclined faces on the rim section and clamping ring aforesaid, a tire supporting split ring adapted to engage the edges of the plate aforesaid and having its inner surface formed with inclined faces to engage the inclined faces on the rim section and clamping ring, and means to secure said clamping ring to the wheel.

5. In an automobile wheel, a rim section formed with an inclined face, a clamping ring secured to said wheel and having a portion inclined oppositely to the rim section of the wheel, a plate secured to the rim section and having its inner side provided with an inclined face to engage an inclined face of the clamping ring, opposite edges of the plate formed on converging planes, and a split ring mounted on the rim section and clamping ring aforesaid and having its opposite ends formed on converging planes to engage the edges of the plate aforesaid, and the inner side of the ring formed with inclined faces to engage the inclined faces of the rim section and clamping ring.

In testimony whereof I affix my signature.

JACOB H. FRIEND.